(12) United States Patent
Baehring et al.

(10) Patent No.: US 12,032,343 B2
(45) Date of Patent: Jul. 9, 2024

(54) CONTROL SYSTEM FOR CONTROLLING A MACHINE USING A CONTROL AGENT WITH PARALLEL TRAINING OF THE CONTROL AGENT

(71) Applicant: Robert Bosch GmbH, Stuttgart (DE)

(72) Inventors: Dietrich Baehring, Stuttgart-Ost (DE); Kirolos Samy Attia Abdou, Stuttgart (DE); Klaus Weber, Stuttgart (DE); Ricardo Esteves Borges, Unterroth (DE)

(73) Assignee: ROBERT BOSCH GMBH, Stuttgart (DE)

( * ) Notice: Subject to any disclaimer, the term of this patent is extended or adjusted under 35 U.S.C. 154(b) by 444 days.

(21) Appl. No.: 17/398,320

(22) Filed: Aug. 10, 2021

(65) Prior Publication Data
US 2022/0066401 A1 Mar. 3, 2022

(30) Foreign Application Priority Data
Aug. 27, 2020 (DE) .......................... 102020210823.4

(51) Int. Cl.
*G05B 13/02* (2006.01)
*B25J 9/16* (2006.01)
*G06N 3/045* (2023.01)

(52) U.S. Cl.
CPC ............ *G05B 13/027* (2013.01); *B25J 9/161* (2013.01); *G06N 3/045* (2023.01)

(58) Field of Classification Search
CPC .................................................... G05B 13/027
USPC ............................................................. 700/4
See application file for complete search history.

(56) References Cited

U.S. PATENT DOCUMENTS

2020/0192340 A1\* 6/2020 Gooch ................. G05B 13/027
2020/0234117 A1\* 7/2020 Hafner ..................... G06N 3/08

FOREIGN PATENT DOCUMENTS

DE 202017105598 U1 5/2018

\* cited by examiner

*Primary Examiner* — Jigneshkumar C Patel
(74) *Attorney, Agent, or Firm* — NORTON ROSE FULBRIGHT US LLP; Gerard A. Messina (57) ABSTRACT

A machine control system including a first data processing device having a first central processing unit, which implements a control agent, the first data processing unit communicating control commands to the machine and receiving process and environmental data from the machine, which contain state information about the state of the machine and/or an environment of the machine. A second data processing device receives the state information from the first data processing device and implements a copy of the control agent. The second data processing device ascertains, with the aid of one or multiple graphics processing units and/or one or multiple tensor processing units, an update of the copy of the control agent by reinforcement learning, using the state information, and communicates the update to the first data processing device.

6 Claims, 4 Drawing Sheets

CONTROL SYSTEM FOR CONTROLLING A MACHINE USING A CONTROL AGENT WITH PARALLEL TRAINING OF THE CONTROL AGENT

CROSS REFERENCE

The present application claims the benefit under 35 U.S.C. § 119 of German Patent Application No. DE 102020210823.4 filed on Aug. 27, 2020, which is expressly incorporated herein by reference in its entirety.

FIELD

Different exemplary embodiments of the present invention generally relate to machine control systems.

BACKGROUND INFORMATION

A control device for a machine, such as a robot, may be trained by so-called reinforcement learning (RL) for carrying out a particular task, e.g., in a manufacturing process. Carrying out the task typically includes selecting an action for each state in a sequence of states, i.e., it may be viewed as a sequential decision problem. Depending on the states reached by the selected actions, in particular the end state, each action yields a particular return, which results, for example, from whether the action permits or does not permit the reaching of an end state, for which a reward is granted (e.g., for achieving the objective of the task).

However, carrying out reinforcement learning, in particular "deep" reinforcement learning, which involves the training of neural networks, requires comprehensive computing resources to be able to be carried out within an acceptable period of time, which may not be provided by a typical machine control device (e.g., an industrial PC). Replacing machine control devices of this type with machine control devices having sufficient computing power is, however, undesirable (for example, due to the existing costs).

SUMMARY

Approaches are therefore desirable, which make it possible to implement reinforcement learning without replacing existing machine control devices (e.g., plant computers).

According to one specific embodiment of the present invention, a machine control system is provided, including a first data processing device, which includes a first central processing unit, which is configured to implement a control agent, which is configured to select control actions for a machine. The first data processing device further includes a control interface to the machine, which is configured to communicate control commands to the machine for carrying out the selected control actions and to receive process and environmental data from the machine (e.g., sensor data), which contain state information about the state of the machine and/or environment of the machine. The machine control system also includes a second data processing device, which includes a data communication interface for communicating with the first data processing device, the data communication interface being configured to receive the state information from the first data processing device. The second data processing device includes a second central processing unit, which is configured to implement a copy of the control agent. The second data processing device additionally includes one or multiple graphics processing units and/or one or multiple tensor processing units, the second central processing unit being configured to ascertain an update of the copy of the control agent with the aid of the one or the multiple graphics processing units and/or the one or the multiple tensor processing units by reinforcement learning, using the state information. The second data processing device is configured to communicate the update to the first data processing device, and the first data processing device is configured to update the control agent implemented by it according to the ascertained update.

The machine control system in accordance with an example embodiment of the present invention makes it possible to apply reinforcement learning to processes in the real world and makes it possible to automatically and continuously improve the control of the processes. The machine control system does not require the changing of a control device (first data processing device), as is provided, e.g., in a production hall, since it is possible to add a more powerful second data processing device while retaining the control device. Only one communication network needs to be implemented (for the data communication interface), e.g., a local (possibly wireless) network for providing a communication between the two data processing devices. The approach according to the machine control system described above may thus be applied to existing machines if the possibility exists that their control device may communicate with additional processing resources, i.e., a corresponding connectivity, which permits the distribution of RL tasks (control and training) to different devices.

The approach according to the machine control system in accordance with an example embodiment of the present invention permits the reuse of existing machines (e.g., robots) and permits their retrofitting, so that they automatically and continuously learn in an RL-based manner without being changed. This saves costs and complexity and promotes sustainability.

In particular, the machine control system described above makes a so-called online learning possible. This refers to learning in real time, in which the control device may access the flow of state information directly from the controlled system and process it. Online learning of this type is typically necessary for applications in which uncertainty factors of the controlled system may not be modeled accurately enough in a simulation environment.

The cycle of providing state information and updating the control agent may run without interruption and without impairing or stopping the controlled process.

Different exemplary embodiments are indicated below.

Exemplary embodiment 1 is the machine control system described above.

Exemplary embodiment 2 is the machine control system according to exemplary embodiment 1, the control agent and the copy of the control agent each being implemented with the aid of one or multiple neural networks, and the carrying out of the reinforcement learning including the training of the one or multiple neural networks.

In particular, the training of neural networks requires extensive computing resources and is made possible by distributing control and training to two data processing devices.

Exemplary embodiment 3 is the machine control system according to exemplary embodiment 2, the update of the copy of the control agent being an update of the weights of the copy of the control agent, and the second data processing device being configured to communicate the updated weights to the first data processing device.

The communication of the weights makes it possible to easily update the control agent, which may be carried out so rapidly that the control does not need to be interrupted.

Exemplary embodiment 4 is the machine control system according to one of exemplary embodiments 1 through 3, including a state information buffer, which is configured to collect state information, and the second central processing unit being configured to ascertain the update of the copy of the control agent, using the collected state information when the quantity of the collected state information has reached a threshold value.

State information may thus be communicated continuously by the first data processing device, and the second data processing device may carry out a suitable training run if sufficient data is available therefor (e.g., a certain number of partial training data sets (mini-batches)).

Exemplary embodiment 5 is a method for controlling a machine, which includes selecting control actions for a machine by a control agent, which is implemented by a first data processing device; communicating control commands for carrying out the selected control actions to the machine by the first data processing device; receiving process and environmental data from the machine, which contain state information about the state of the machine and/or an environment of the machine, by the first data processing device; communicating the state information from the first data processing device to a second data processing device; the second data processing device implementing a copy of the control agent; ascertaining, with the aid of one or multiple graphics processing units and/or one or multiple tensor processing units, an update of the copy of the control agent, using the state information; communicating the update from the second data processing device to the first data processing device; and updating the control agent implemented by the first data processing device according to the ascertained update.

Exemplary embodiment 6 is a computer program, including program instructions, which, when executed by one or multiple processors, induce the one or multiple processors to carry out a method according to exemplary embodiment 5.

Exemplary embodiment 7 is a computer-readable storage medium, on which program instructions are stored, which, when executed by one or multiple processors, induce the one or multiple processors to carry out a method according to exemplary embodiment 5.

Exemplary embodiments described in connection with the machine control system apply similarly to the method for controlling a machine.

Exemplary embodiments of the present invention are illustrated in the figures and explained in greater detail below. In the figure, the same reference numerals generally relate to the same parts everywhere in the multiple views. The figures are not necessarily true to scale, the focus instead being generally on the illustration of the basics of the present invention.

DETAILED DESCRIPTION OF EXAMPLE EMBODIMENT

The different specific embodiments, in particular the exemplary embodiment described below, may be implemented with the aid of one or multiple circuits. In one specific embodiment of the present invention, a "circuit" may be understood to be any type of logic-implemented entity, which may be hardware, software, firmware or a combination thereof. In one specific embodiment, a "circuit" may therefore be a hardwired logic circuit or a programmable logic circuit, such as a programmable processor, for example a microprocessor. A "circuit" may also be software, which is implemented or executed by a processor, for example any type of computer program. Another other type of implementation of the particular functions, which are described in greater detail below, may be understood as a "circuit": in correspondence with an alternative specific embodiment.

Figure 1:
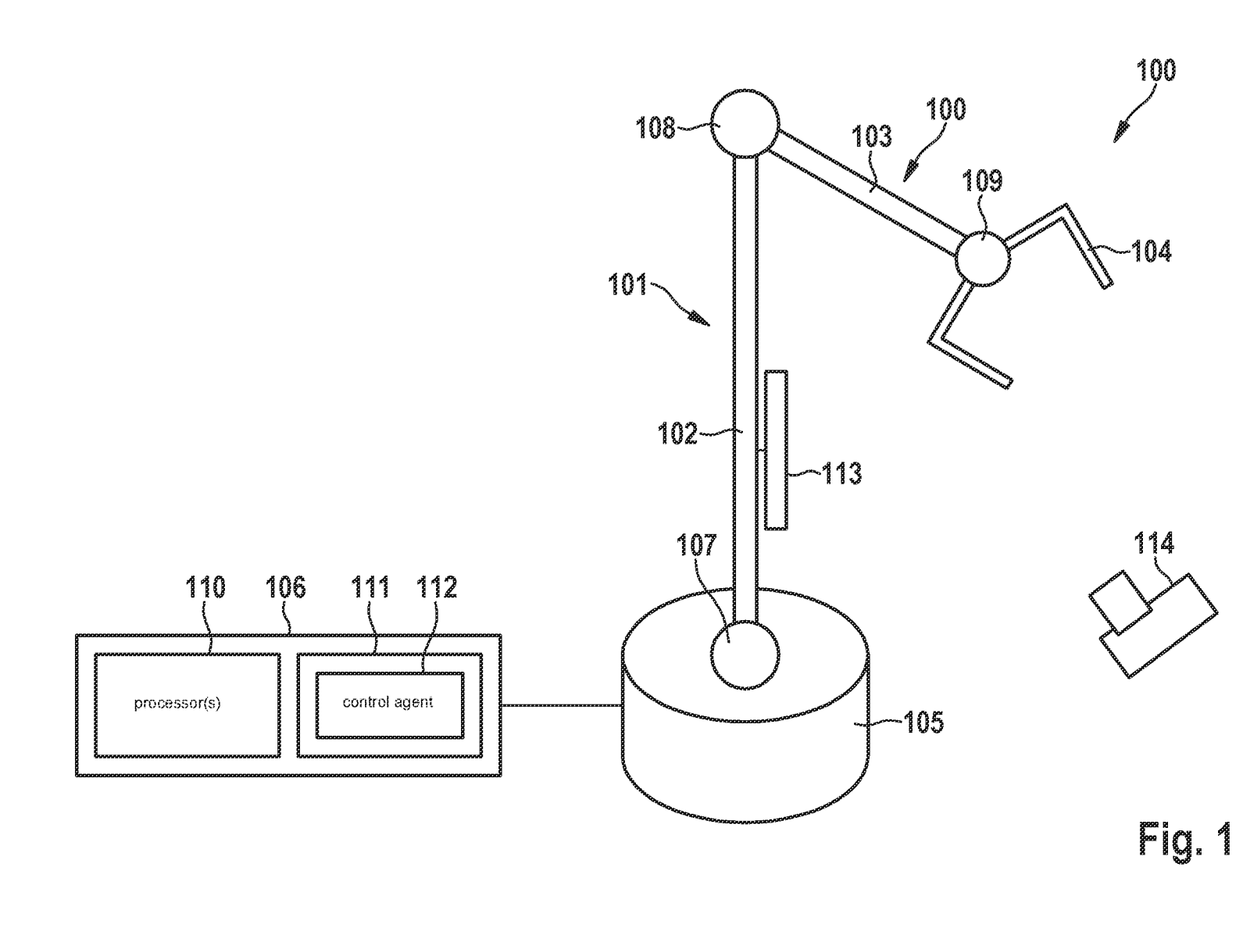
FIG. 1 shows a robot device.

FIG. 1 shows a robot device 100.

Robot device 100 includes a robot 101, e.g., an industrial robot arm for handling or mounting a workpiece or one or multiple other objects 114. Robot 101 includes manipulators 102, 103, 104 and a base (e.g., a holder) 105, which carries manipulators 102, 103, 104. The term "manipulator" refers to the moving parts of robot 101, whose actuation permits a physical interaction with the environment, e.g., for carrying out a task. To control the robot, robot device 100 includes a (robot-) control device 106, which is configured in such a way that it implements the interaction with the environment according to a control program. Last member 104 (the farthest away from holder 105) of manipulators 102, 103, 104 is also referred to as an end effector 104 and may include one or multiple tools, such as a welding torch, a gripping instrument, a painting unit or the like.

The other manipulators 102, 103 (closer to base 105) may form a positioning device, so that, together with end effector 104, robot 101 is provided with end effector 104 at its end. Robot 101 is a mechanical arm, which may perform similar functions as a human arm (possibly including a tool at its end).

Robot 101 may include articulated elements 107, 108, 109, which connect manipulators 102, 103, 104 to each other and to holder 105. One articulated element 107, 108, 109 may include one or multiple joints, each of which may permit a rotary motion (i.e., a rotational motion) and/or a translatory motion (i.e., a displacement) of the associated manipulators relative to each other. The motion of manipulators 102, 103, 104 may be initiated with the aid of actuators, which are controlled by control device 106.

The term "actuator" may be understood to be a component, which is configured in such a way that it influences a mechanism or process as a reaction to the activation. The actuator may convert instructions output by control device 106 (the so-called activation) into mechanical motions. The actuator, e.g., an electromechanical converter, may be configured in such a way that it converts electrical energy into mechanical energy as a reaction to the activation.

Robot 101 may include sensors 113 (e.g., one or multiple cameras, position sensors, etc.), which are configured to ascertain the state of the robot and the one or multiple manipulated objects 114 (i.e., the environment), which results from the activation of the actuators and the resulting motions of the robot.

In the present example, control device 106 includes one or multiple processors 110 and a memory 111, which stores program code and data, based on which processor 110 controls robot 101. According to different specific embodiments, control device 106 controls robot 101 of a control agent 112 implemented by the control device, which, in turn, implements a control policy.

One possibility for generating a control policy is reinforcement learning (RL). Reinforcement learning is characterized by a trial-and-error search and a delayed reward. In contrast to monitored learning of a neural network, which requires labels for training, RL uses a trial-and-error mechanism to learn an assignment of states to actions in such a way that a reinforcement signal, which is referred to as a return, is maximized. With RL, it is attempted by trial and error to find actions which result in higher rewards, in that these are tried out. The selection of the action not only affects the reward of the present state but also the rewards of all future states. "Deep reinforcement learning" (DRL) means the use of monitored learning to train a neural network, which may estimate a return or map states directly to actions.

The training of AI (artificial intelligence) models of sufficient complexity requires data processing devices which include "strong" data processing components, such as graphics processing units (GPUs) or tensor processing units (TPUs). A data processing device used as machine control device 106, for example in a production hall for controlling a robot 101 in a manufacturing process, e.g., an industrial PC, IPC, typically does not include "strong" data processing components in this sense.

The discrepancy between "weak" data processing components, e.g., in a production hall, which may only carry out (but not train) AI models, and "strong" data processing components, which are necessary to train AI models of this type, is typically resolved by offline training. This means that, after a large quantity of training data has been collected in the production hall (or at another location where a robot or generally a machine is used), the AI model is trained with the aid of this data on a "strong" data processing device (i.e., a data processing device including strong data processing components), which is situated at a different location (therefore referred to as "offline") until the performance of the AI model is satisfactory. It is then, for example, utilized on a "weak" data processing device (i.e., a data processing device without strong data processing components) in the production hall and used during operation over a long period of time.

However, this approach is not applicable to typical RL methods. An RL agent that learns to control a process in the real world or to improve the control of a process in the real world requires constant feedback from the process. This feedback shows the RL agent the result of its actions in the form of process state series and associated rewards.

According to different specific embodiments, this problem is solved by a specific data processing infrastructure, which provides the doubling of the RL agent into a control agent and a training agent and provides a dynamic interaction between the two agents.

Figure 2:
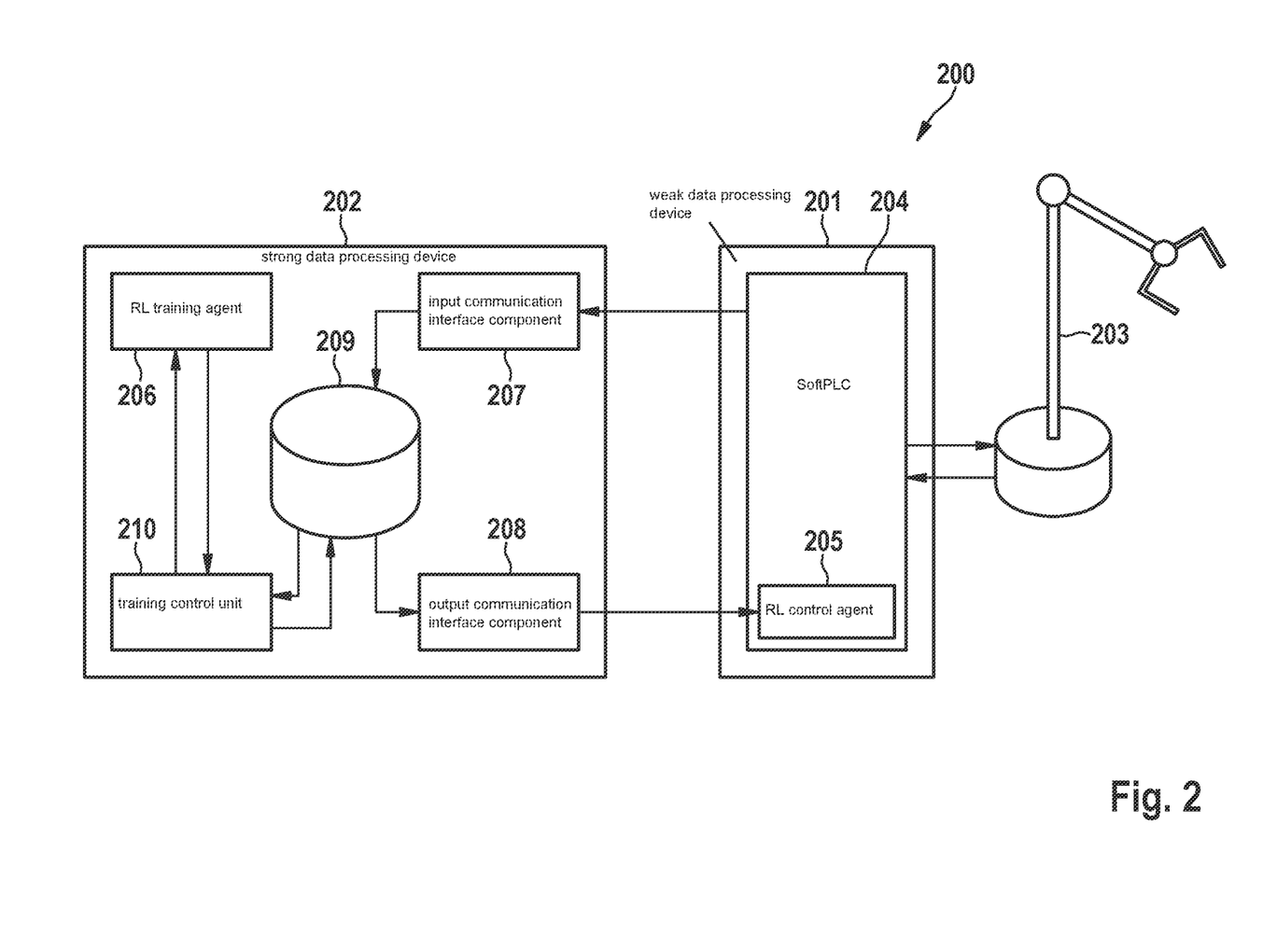
FIG. 2 shows a machine control system according to one specific example embodiment of the present invention.

FIG. 2 shows a machine control system 200 according to one specific embodiment.

Machine control system 200 includes a weak data processing device 201, which implements, e.g., a SoftPLC 204 (i.e. programmable logic controller in software) and is made up of a PC, such as an industrial PC, embedded PC or box PC. This weak data processing device 201 thus includes only a central processing unit (CPU) but no coprocessor suitable for training AI models, i.e., no coprocessor which may carry out the training of an AI model (e.g., the training of an RL agent) faster than the CPU. Weak data processing device 201 corresponds, for example, to control device 106.

Machine control system 200 also includes a strong data processing device 202, i.e., a data processing device which includes one or multiple coprocessors, which may carry out the training of an AI model faster compared to the CPU of weak data processing device 201 (and also possibly compared to a CPU of strong data processing device 202). The one or multiple coprocessors are, for example, one or multiple graphics processing units or one or multiple tensor processing units.

Weak data processing device 201 sends control commands to a robot 203. Each control command (which may contain control signals for one or multiple actuators) is given by an action $a_t$, which is selected for a present state $s_t$ of the environment (robot plus manipulated objects, working area, etc.) by an RL control agent 205, which is implemented by weak data processing device 201. However, weak data processing device 201 receives from robot 203 information (i.e., process and environmental data, e.g., sensor data), which indicates next reached state $s_{t+1}$ of the environment. This information is also referred to below as state information.

Strong data processing device 202 implements an RL training agent 206. Weak data processing device 201 and strong data processing device 202 are connected via a communication interface, in this example, on the side of strong data processing device 202, the communication direction from weak data processing device 201 to strong data processing device 202 is implemented by an input communication interface component 207, and the communication direction from strong data processing device 202 to weak data processing device 201 is implemented by an output communication interface component 208.

Each of communication interface components 207, 208 is implemented, for example, with the aid of a UMC (universal machine connector). This is a device which is able to connect data sources of different types to data sinks of different types. In the example of FIG. 2, a first UMC, which implements first communication interface component 207, connects SoftPLC 204 as the data source to a memory 209 of strong data processing device 202 as the data sink, and a second UMC, which implements second communication interface component 208, connects memory 209 as the data source to SoftPLC 204 as the data sink.

Memory 209 stores, in particular, state information (i.e. data about the states of the environment), i.e., implements a buffer or a database for state information which is supplied from weak data processing device 201 to strong data processing device 202.

A training control unit 210 of strong data processing device 202 monitors the state information in memory 209 (in particular, the quantity of the state information not yet taken into account for training RL training agent 206). If the state information meets a certain condition (e.g., if the quantity of the pieces of state information not yet taken into account for training RL training agent 206 exceeds a threshold value), training control unit 210 starts a training run of the RL training agent, using the state information (in particular, the state information not previously taken into account for training by RL training agent 206 (i.e., in previous training runs)). After the training, the RL training agent supplies the parameters of the RL agent, and training control unit 210 stores the parameters in memory 209. Second communication interface component 208 supplies the parameters to SoftPLC 204, which updates RL control agent 205 with the parameters.

The RL agent which is implemented by the RL control agent and the RL training agent and is trained by the training control unit may be an arbitrary RL model, such as an actor-critic model. In this case, the parameters are the weights of the neural network which implements the actor, and those of the neural network which implements the critic.

Input communication interface component 207 may monitor, for example, the state information present on weak data processing device 201, and, if it changes, retrieve it and transfer it to memory 209. Output communication interface component 208 may monitor the RL agent parameters in memory 209 and, if they change (i.e., updated by training control unit 210), transfer (forward) them to weak data processing device 201.

Weak data processing device 201 and strong data processing device 202 are thus connected dynamically with the aid of a buffer for processing state information according to different exemplary embodiments.

The RL control agent is formed, for example, by a compiled version of the RL agent. The RL training agent is formed, for example, by the original code of the RL agent. In the case of an actor-critic model, the RL control agent contains, for example, only the actor portion of the RL agent if it must determine an action to be carried out. The RL training agent implements both the actor and the critic.

According to different specific embodiments, two RL agents having the same level of knowledge are thus used. One of the RL agents (implemented by control agent 205) is responsible for the ongoing control of robot 203, and the other one (implemented by the RL training agent) is used by training control unit 210 for training (with the aid of reinforcement learning).

Both RL agents 205, 206 are operated simultaneously. While RL control agent 205 controls the robot (e.g., for a manufacturing process), training control unit 210 trains its version of the RL agent to improve the performance of the control. State information is continuously transferred to memory 209. Training control unit 210 removes batches of training data from this buffer and carries out a training run of the RL training agent for each batch. Once a training run is ended, the parameters of the resulting (trained) RL agent are transferred to the RL control agent and implemented, so that the control may be carried out without interruption.

The controlled (e.g. manufacturing) process, which, from the perspective of the RL agent, is an environment or a controlled system which changes in response to control actions, has the present state $s_t$. RL control agent 205 reads this state and generates an action $a_t$ for controlling robot 201 (and thus the process) according to the control policy implemented by it. In response to the action, the environment reaches a new state $s_{t+1}$. The control policy applied by RL control agent 205 is determined by its parameters (e.g., the weights of the neural network which implements the actor).

Input communication interface component 207 collects information about states $s_t$, $s_{t+1}$, . . . and stores them in memory 209. If information about an indicated number of new states (i.e., not yet used for training runs) is present in memory 209, training control unit 210 removes the information about the states and trains RL training agent 206, using this information to improve its control performance.

Training control unit 210 ends a training run, e.g., if a particular performance criterion has been met (or a certain number of training iterations have been carried out), reads out the parameters of the new version of the RL agent resulting from the training run and writes the parameters into memory 209. Alternatively, training control unit 210 may also transfer the parameters directly to weak data processing device 201.

RL control agent 205 updates its parameters during operation and continues the control using the updated parameters. In this way, RL control agent 205 takes on the improved performance achieved by RL training agent 206.

In that this training procedure (collecting state information, carrying out a training run, updating the RL control agent) is carried out repeatedly, the performance of the control improves continuously and automatically.

A conventional standard control device may be designed, for example, for a new process (for which no control is yet present). The RL agent is initialized by this standard control device and is used to control and improve the control performance. An existing control may be generally improved by the RL agent.

An algorithm ("algorithm 1") is indicated below in pseudo code for an application of the procedure described above for an actor-critic model, a target actor being additionally provided for the actor, and a target critic being additionally provided for the critic. The following designations are used:

Ø: Empty set
M: Total number of training iterations (i.e., training runs)
J: Total number of updates of the actor and the critic in one training run
N: Number of state transitions in a partial training data set (mini-batch)
d: Frequency with which the actor network [and] the target networks (target actor and target critic) are updated
$\Phi_0$: Start parameter of the actor (control agent and training agent)
$\theta_0$: Start parameter of the critic (training agent)
$\Pi_\phi$: Actor of the training agent during the RL training, including parameters $\phi$
$Q_\theta$: Critic of the training agent during the RL training, including parameters $\theta$
$\Pi_\phi'$: Target actor of the training agent during the RL training, including parameters $\phi'$
$Q_\theta'$: Target critic of the training agent during the RL training, including parameters $\theta'$
$y_i$: Action value target

| Algorithm 1 |
| --- |
| Initialize the actor of the two RL agents for the first training iteration with simulation results<br>$\phi_0 \leftarrow \phi_{sim}$<br>Initialize the critic of the RL training agent for the first training iteration with simulation results<br>$\phi_0 \leftarrow \phi_{sim}$<br>Initialize the replay buffer<br>$\mathcal{B} \leftarrow \emptyset$<br>Collect data $\mathcal{D}_1$ from the control agent by interacting with the environment.<br>for m = 1 to M do<br>    Initialize critic network $Q_\theta$ and actor network $\pi_\phi$ with the parameters of the previous iteration:<br>    $\theta \leftarrow \theta_{m-1}$ and $\phi \leftarrow \phi_{m-1}$<br>    Initialize target networks $\theta' \leftarrow \theta$ and $\phi' \leftarrow \phi$<br>    Add $\mathcal{D}_m$ to replay buffer $\mathcal{B}$ after calculating the return of each state transition<br>    for j = 1 to J do<br>        Remove a random partial data set having N state transitions $(s_i, a_i, r_i, s_{i+1})$ from $\mathcal{B}$ |

-continued

Algorithm 1

Figure 3:
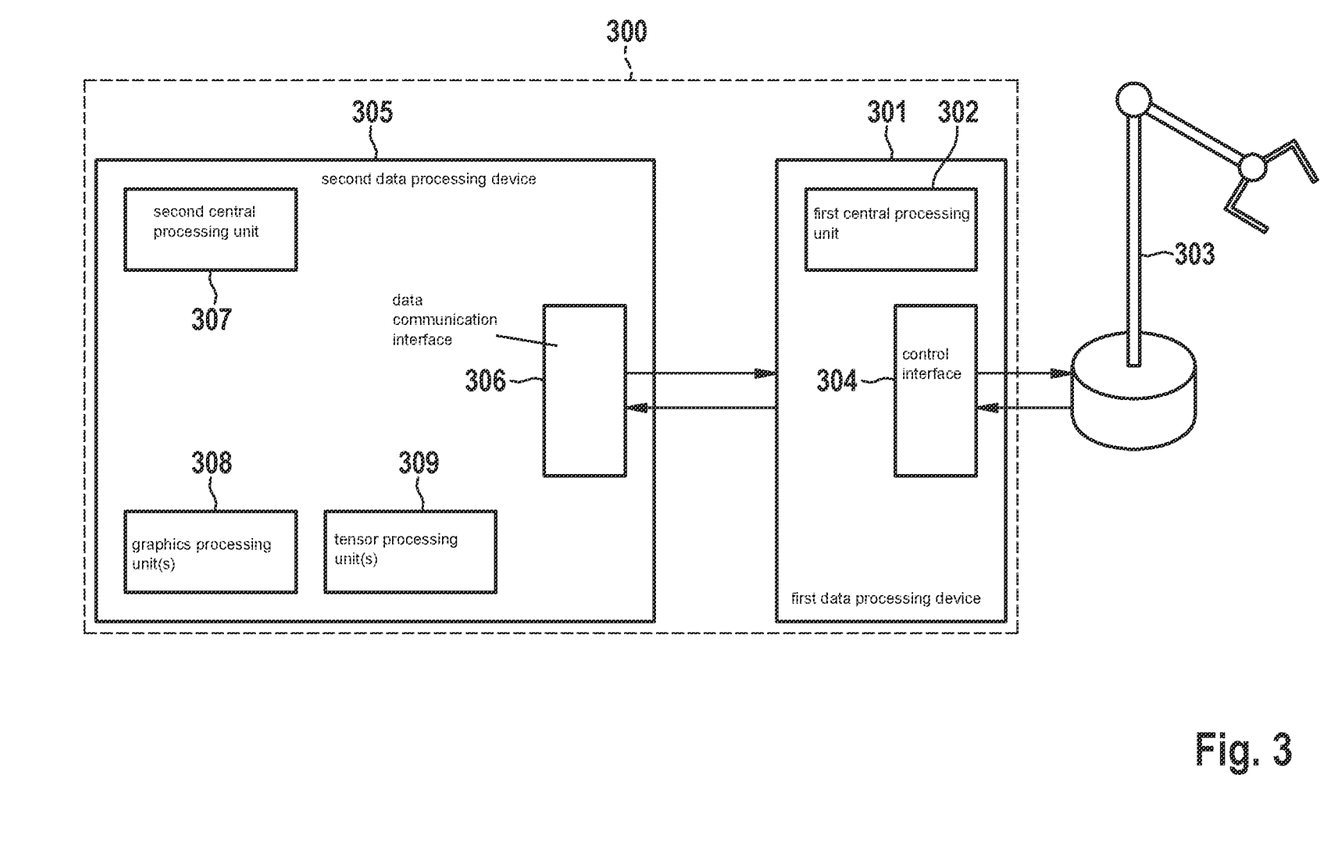
FIG. 3 shows a machine control system according to a further specific example embodiment of the present invention.

Calculate action value target
$y_i = r_i + \gamma Q\theta'(s_{i+1}, \pi_{\phi}`(s_{i+1}))$
Update the critic network of the training agent
$\theta_i \leftarrow \text{argmin}_\theta N^{-1}\Sigma_i(y_i - Q_\theta(s_i, a_i))^2$
if j ≡ mod d then
   Update the actor network, using the deterministic control
   policy gradient
$$\nabla_\phi J(\phi) = N^{-1}\sum_i \nabla_a Q_\theta(s_i, a_i)|a_i = \pi_\phi(s_i)\nabla_\phi \pi_\phi(s_i)$$
   Update the target networks
     $\theta' \leftarrow \tau\theta + (1 - \tau)\theta'$
     $\phi' \leftarrow \tau\phi + (1 - \tau)\phi'$
   end if
end for
Set start parameters of the next iteration
$\theta_m \leftarrow \theta$ and $\phi_m \leftarrow \phi$
Transmit control policy $\theta_m$ to the control agent and collect
new data $\mathcal{D}_{m+1}$
end for In summary, a machine control system is provided according to different specific embodiments, as illustrated in FIG. 3.

FIG. 3 shows a machine control system 300 according to one specific embodiment.

Machine control system 300 includes a first data processing device 301, which includes a first central processing unit (CPU) 302, which is configured to implement a control agent, which is configured to select control actions for a machine 303.

First data processing device 301 further includes a control interface 304 to the machine 303, which is configured to communicate control commands to the machine 303 for carrying out the selected control actions and to receive process and environmental data (e.g., sensor data) from machine 303, which contain state information about the state of the machine and/or an environment of the machine.

Machine control system 300 also includes a second data processing device 305, which includes a data communication interface 306 for communicating with first data processing device 301, data communication interface 306 being configured to receive the state information from first data processing device 301.

Second data processing device 305 includes a second central processing unit 307, which is configured to implement a copy of the control agent.

Second data processing device 307 additionally includes one or multiple graphics processing units 308 and/or one or multiple tensor processing units 309.

Second central processing unit (CPU) 307 is configured to ascertain an update of the copy of the control agent with the aid of the one or multiple graphics processing units 308 and/or the one or multiple tensor processing units 309 by reinforcement learning, using the state information.

Second data processing device 305 is configured to communicate the update to the first data processing device (e.g., with the aid of data communication interface 306).

First data processing device 301 is configured to update the control agent implemented by it according to the ascertained update (and to use it for the further control of machine 303).

In other words, the training of a control agent, which is used by a first data processing device to control a machine, is carried out by a second data processing device, which contains additional computing resources for carrying out the reinforcement learning, compared to the first data processing device.

The machine control system may be used to control any processes which are represented by a sequence of states and are controlled by a sequence of actions. It processes, for example, a time series using state vectors, which receives them via sensor signals and uses them to calculate a control signal for a physical system. For example, it controls a machine, a machine being able to be understood as any physical system (including a mechanical part whose motion is controlled), such as a robot, a vehicle, a household appliance, a power tool, a manufacturing machine, a personal assistant or an access control system.

The first data processing device and the second data processing device may be situated separately from each other (e.g., separated multiple meters from each other, e.g., more than 10 m, 20 m, 50 m or 100 m), for example in different areas of a factory, e.g., in a production hall (first data processing device) and in a server room (second processing device) of a factory. The distance between the two data processing devices is ultimately limited only by the data communication speed. If the connection permits the two data processing devices to communicate with each other fast enough, they may also be situated at a very great distance from each other, e.g., the second data processing device may be situated in a central data processing center in a different country than the first data processing device. Specific embodiments are thus not limited to a "single-factory approach."

A graphics processing unit may be understood to be a (co) processor for computers etc., which specializes in and is optimized for the calculation of graphics. A tensor processing unit may be understood to be a coprocessor, which specializes in (and is optimized for) the processing of data during machine learning, in particular the processing of data in artificial neural networks.

Figure 4:
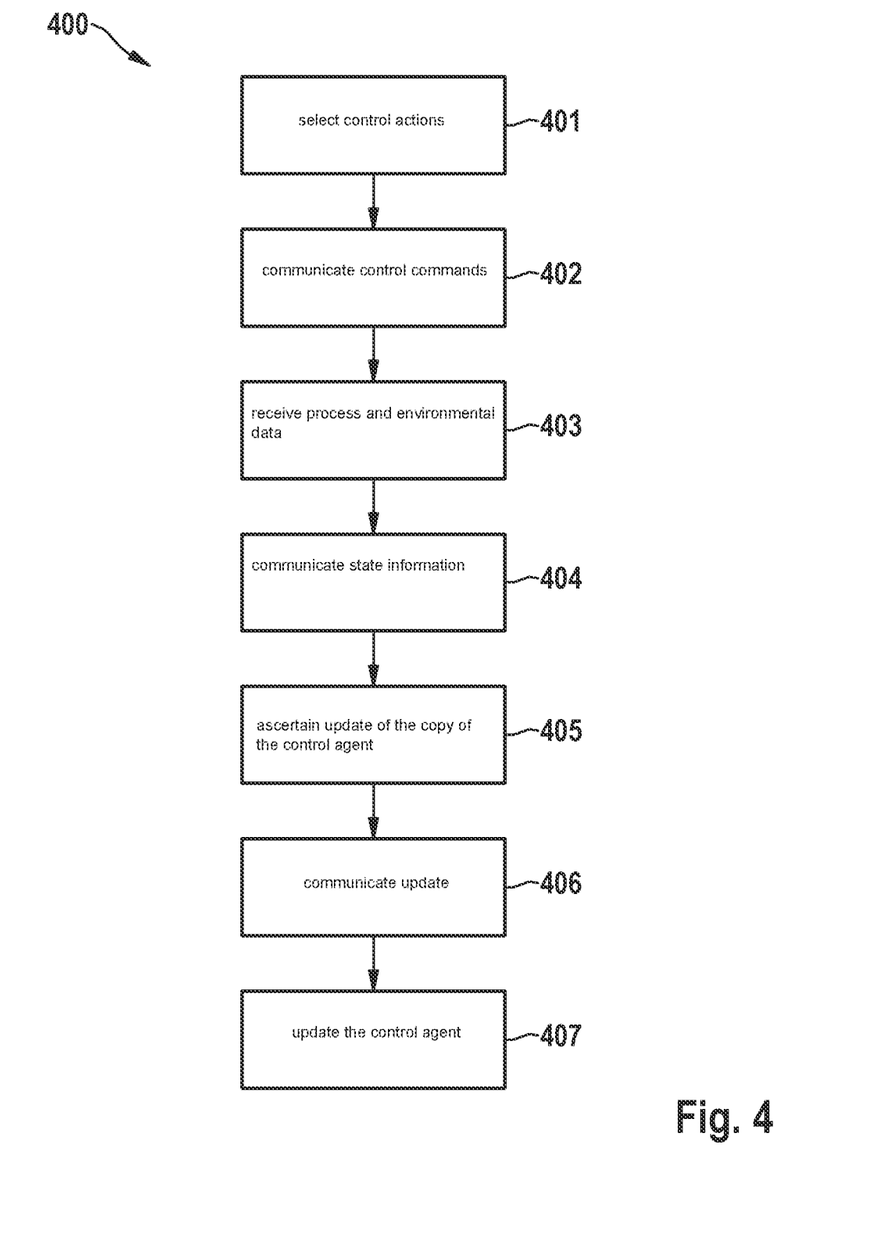
FIG. 4 shows a method for controlling a machine according to one specific example embodiment of the present invention.

FIG. 4 shows a method for controlling a machine according to one specific embodiment of the present invention.

The method includes the following:

In 401, selecting control actions for a machine by a control agent, which is implemented by a first data processing device;

In 402, communicating control commands for carrying out the selected control actions to the machine by the first data processing device;

In 403, receiving process and environmental data from the machine, which include state information about the state of the machine and/or an environment of the machine, by the first data processing device;

In 404, communicating the state information from the first data processing device to a second data processing device, the second data processing device implementing a copy of the control agent;

In 405, ascertaining, with the aid of one or multiple graphics processing units and/or one or multiple tensor processing units, an update of the copy of the control agent, using the state information;

In 406, communicating the update from the second data processing device to the first data processing device; and In 407, updating the control agent implemented by the first data processing device according to the ascertained update.

According to one specific embodiment, the method is computer-implemented.

Although the present invention was illustrated and described primarily with reference to certain specific embodiments, it should be understood by those skilled in the art that numerous modifications with respect to the design and details may be carried out thereto without departing from the essence and the field of the present invention.

What is claimed is:

1. A machine control system comprising:
a first processing device that includes a first processor; and
a second processing unit that includes at least one second processor;
wherein:
the machine control system is configured to perform a method for controlling a machine, the method comprising, during a control session in which the machine is controlled to achieve a target state from an initial state:
in a first iterative process including a plurality of iterations, the first processor performing the following in each of the iterations of the first iterative process:
executing a first instance of a control agent to select a respective control action
communicating one or more control commands to the machine for carrying out the selected control action;
receiving respective sensor data from the machine; and
communicating state information about a state of the machine and/or an environment of the machine that is based on the received sensor a memory that is accessible by the at least one second processor;
in a second iterative process including a plurality of iterations, the at least one second processor performing the following in each of the iterations of the second iterative process:
performing an iterative reinforcement learning using the state information that has been communicated to the memory during the control session to ascertain an update for the first instance of the control agent by operating on a second instance of the control agent; and
communicating the update to the first data processing device; and
updating the first instance of the control agent by the first data processing device according to the update communicated from the at least one second processor;
the first iterative process and the second iterative process are run in parallel, so that different ones of the iterations of the first iterative process operate on different versions of the first instance of the control agent due to the updating performed based on the communicated updates of the iterations of the second iterative process; and
the at least one second processor includes at least one of (a) one or more graphics processing units (GPUs) and (b) one or more tensor processing units (TPU).

2. The machine control system as recited in claim 1, wherein the first and second instances of the control agent are each implemented using one or multiple neural networks, and the reinforcement learning includes training the one or multiple neural networks.

3. The machine control system as recited in claim 2, wherein the updating is performed by an update of weights of the first instance of the control agent, and the communicating of the update to the first data processing device is performed by communicating the updated weights to the first data processing device.

4. The machine control system as recited in claim 1, wherein the memory is operated as a buffer in which different sets of the state information are stored over time, and the machine control system is configured such that the second central processing unit is triggered to begin a new session of the iterative reinforcement learning in response to a quantity of the state information stored in the buffer reaching a predefined threshold value.

5. A method for controlling a machine using a first processing device that includes a first processor and using a second processing unit that includes at least one second processor, the method comprising:
during a control session in which the machine is controlled to achieve a target state from an initial state:
in a first iterative process including a plurality of iterations, the first processor performing the following in each of the iterations of the first iterative process:
executing a first instance of a control agent to select a respective control action;
communicating one or more control commands for carrying out the selected control action to the machine;
receiving respective sensor data from the machine; and
communicating state information about a state of the machine and/or an environment of the machine that is based on the received sensor data to a memory that is accessible by the at least one second processor;
in a second iterative process including a plurality of iterations, the at least one second processor performing the following in each of the iterations of the second iterative process:
performing an iterative reinforcement learning using the state information that has been communicated to the memory during the control session to ascertain an update for the first instance of the control agent by operating on a second instance of the control agent; and
communicating the update to the first data processing device; and
updating the first instance of the control agent by the first data processing device according to the update communicated from the at least one second processor;
wherein:
the first iterative process and the second iterative process are run in parallel, so that different ones of the iterations of the first iterative process operate on different versions of the first instance of the control agent due to the updating performed based on the communicated updates of the iterations of the second iterative process; and
the at least one second processor includes at least one of (a) one or more graphics processing units (GPUs) and (b) one or more tensor processing units (TPU).

6. A set of non-transitory computer-readable storage media on which are stored program instructions for controlling a machine using a system having a first processing device that includes a first processor and a second processing unit that includes at least one second processor, the program instructions, when executed by the system, causing the system to perform a method, the method comprising:
during a control session in which the machine is controlled to achieve a target state from an initial state:

in a first iterative process including a plurality of iterations, the first processor performing the following in each of the iterations of the first iterative process:
   executing a first instance of a control agent to select a respective control action;
   communicating one or more control commands for carrying out the selected control action to the machine;
   receiving respective sensor data from the machine; and
   communicating state information about a state of the machine and/or an environment of the machine that is based on the received sensor data to a memory that is accessible by the at least one second processor;
in a second iterative process including a plurality of iterations, the at least one second processor performing the following in each of the iterations of the second iterative process:
   performing an iterative reinforcement learning using the state information that has been communicated to the memory during the control session to ascertain an update for the first instance of the control agent by operating on a second instance of the control agent; and
   communicating the update to the first data processing device; and
updating the first instance of the control agent by the first data processing device according to the update communicated from the at least one second processor;
wherein:
   the first iterative process and the second iterative process are run in parallel, so that different ones of the iterations of the first iterative process operate on different versions of the first instance of the control agent due to the updating performed based on the communicated updates of the iterations of the second iterative process; and
   the at least one second processor includes at least one of (a) one or more graphics processing units (GPUs) and (b) one or more tensor processing units (TPU).

* * * * *